Oct. 23, 1951 — T. C. GLENN — 2,572,133

ROLLER SKATE TRUCK CONSTRUCTION

Filed June 11, 1947

INVENTOR.
THOMAS C. GLENN
BY
ATTORNEY

Patented Oct. 23, 1951

2,572,133

UNITED STATES PATENT OFFICE 2,572,133

ROLLER SKATE TRUCK CONSTRUCTION

Thomas C. Glenn, Berea, Ohio

Application June 11, 1947, Serial No. 753,921

6 Claims. (Cl. 280—11.28)

My invention pertains to a roller-skate or other vehicle and more particularly to two distinctive features of construction, namely, the manner of connection of, and the principle of operation of, the structure between each truck and a shoe-tread plate and also a lockable connection between the tread-plate and the heel of a shoe.

Being myself a skater of more than average skill, acquired during decades of use of many variations in design at prices in excess of fifty dollars a pair, I am not unaware that the manufacture of roller-skates has been an enterprise of protracted evolution and that the industry has reached a high stage of development; yet I believe that the desideratum of a combination of firmness of support together with a natural or instinctive maneuverability has not hitherto been attained.

One object of my origination has been the automatic, relatively reversed turning of the trucks with consequent shortening of the distance between the bases of the rollers on one side, in response to extra foot-pressure tending to tilt the tread-plate toward that side.

Another object was the facility of assemblage of its parts with ready detachability and certain adjustment provisions.

A further object has been to provide a mutually cooperative pair of universal-pivot connections at each truck with the tread-plate, one of each truck associated connections being spring controlled while the spring-pressure is regulatory.

Still another object was the symmetrical assembly with front and rear trucks identical and interchangeable together with a symmetrical bar, varying only in length, connecting the trucks beneath the tread-plate.

A general object has been to provide a roller-skate which is sufficiently light in weight, strong, durable, responsive and duly economical of manufacture.

I would have myself credited with the realization that the scope of my origination, as defined by the granted claims, comprehends equivalent constructions and that the showing of the drawings and the specific description are merely to exemplify variable mechanical embodiments, arrangements and applications of the distinguishing principle.

Figure 1:
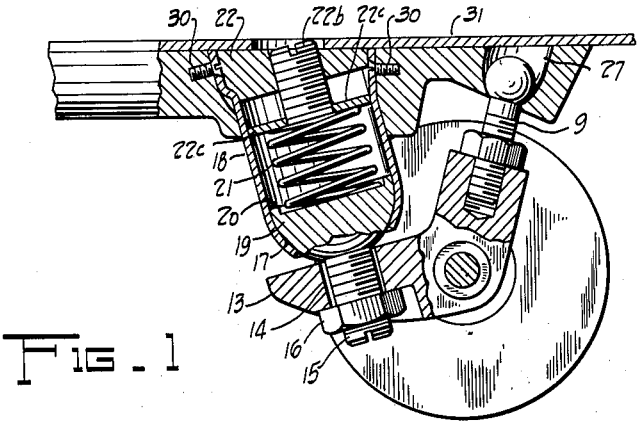
Figure 1 is a side view, partly in longitudinal section and partly broken away, of one of two duplicated truck connections whereby the truck may be automatically turned in response to a lateral shift of the weight of the wearer.
Figure 2:
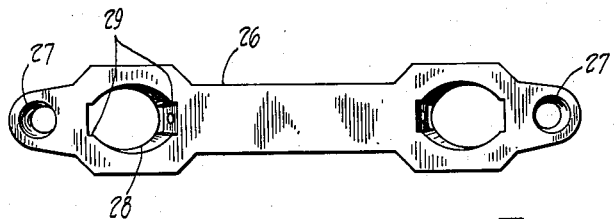
Figure 2 is a top plan view of a bar connecting the truck pair.
Figure 3:
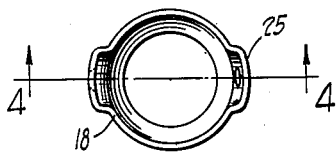
Figure 3 is a top plan view of a cylinder.
Figure 5:
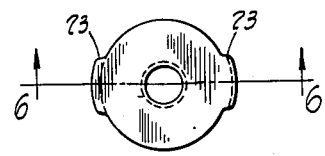
Figure 5 is a plan view of a spring-covering disc.

A superstructure, generally designated by the numeral 1 serves to connect, in the usual manner, the front and rear trucks. The trucks are of identical construction throughout, with an obvious advantage, though reversedly arranged with respect to each other. Consequently, the singular number shall hereinafter be employed both in describing the construction thereof and in describing the mechanism, likewise duplicated, for effecting connection of the superstructure extending between the pair of trucks. A truck comprises a hub structure 2 of peculiar design, an axle 3 extending therethrough and terminating at each of its ends as a threaded formation 4. Rollers 5, of any standard make with an axially spaced series of good anti-friction bearings, are mounted on opposite sides of the intervening hub 2 and held in place, each with a nut (not shown because old practice) coacting with the axle end 4. A finishing cap 6, enclosing a nut is shown wedge-fitted in the outer side of the roller.

The hub 2 includes an oblique (upwardly extending) arm 7 supplied with a tapped hole 8 for the adjustable reception of a complementarily threaded stud 9 the upper end of which terminates as a hardened ball 10 to serve as one element of a universal pivotal connection in a manner to be later explained. A lock nut 11 performs its usual function. Supposing the truck shown in Figure 1 to be the one in front, the arm 7 will constitute the most forwardly part of its hub between its rollers. Each hub furthermore carries another extension 12 which like the arm 7 (with which it forms an obtuse angle) is disposed in the longitudinally-median, vertical plane of the skate and comprises a sturdy bracket 13 similarly fashioned with an obliquely directed hole 14 for loose occupancy by another screw-threaded stud 15 and adapted to be held in any chosen position through the common expedient of a nut 16.

Figure 4:
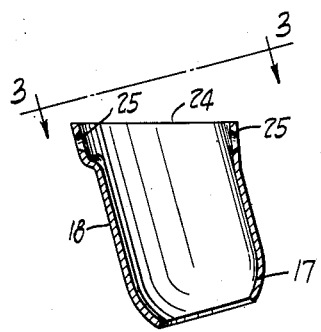
Figure 4 is a longitudinal-vertical section to show the interlock, against relative turning movement, between the truck-connecting bar and top of the cylinder.
Figure 6:
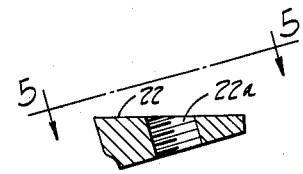
Figure 6 is a vertical, diametrical section of Figure 5.

Before its fitting in the bracket hole 14, the shank of stud 15 is loosely passed through an axially extending hole in a spherically surfaced lower end 17 of an otherwise cylindrical container 18, clearly shown in Figures 1 and 4, and within which the stud 15 has a head fashioned with a complementarily spherically-surfaced, downwardly presented side 19 permitting limited universal pivotal action there. The upper side of the head or annular stud flange may be advantageously formed with circumferentially arranged ratchet-like protuberances (or equivalent notches) 20 for the adjustable, alternate reception of the lower end of a slightly conical, coil spring 21 within the container 18. Backing the upper end of the spring 21 is a disc structure 22 provided with a tapped hole 22a (see Figure 7) preferably of progressively varying thickness diametrically thereacross whereby to compensate for its oblique positioning or to present its upper surface so as to lie in a substantially horizontal plane under normal unloaded condition and adjustably carrying a screw 22b having a lower head 22c directly bearing upon the spring 21. The lower side of the disc 22 may be similarly provided with any chosen number of circumferentially arranged stop shoulders (however mechanically contrived) against one of which the upper end of the spring 21 impinges whereby additionally to prevent a creeping turning movement thereof. Diametrically opposite ears 23 are provided on the disc for a cooperative purpose hereinafter to become evident. Because the container 18 is likewise obliquely disposed (with its axis upwardly directed toward a vertical plane midway between the front and rear trucks) its upper margin 24 is oblique with respect to its axis whereby it normally occupies a substantially horizontal plane. Partially struck-out tongues 25, of diametrically opposite location, are deflected in directions away from each other (see Figure 4) for a coacting purpose soon to be explained. It is to be understood, indeed, has probably been foreseen that the spring 21 is to be held in a selectable degree of compression to function as a reactive element when the upper end of the container 18 has been secured and the disc 22 has become confined, in a manner next to be described.

As an underlying connection between the two trucks I employ a completely symmetrical bar 26, probably to be composed of an aluminum or magnesium alloy to combine lightness in weight with adequate strength. Duplicated ends of the bar 26 are fashioned with downwardly presented, frusto-spherical sockets 27 respectively through axial holes in which the studs 9 are inserted from above whereby the balls 10 are adapted to have seat bearings in the sockets 27, thereby providing the foremost and rearmost of the four universal-pivot connections which are all located in the longitudinal median plane of the skate. Inwardly adjacent to each of the thrust bearings 27, the bar 26 is provided with a hole 28 adapted for the interfitting of the upper end of a cylindrical container 18, as most clearly illustrated in Figure 4. Along the longitudinal middle plane of the bar 26 so as to be diametrically opposite, each of the holes 28 has its upper margin provided with a pair of recesses 29 of three-sided configuration. The shape of the recesses 29 is furthermore such as to accommodate the ears 23 of one of the discs 22, it being desirable to lock the latter against turning movement within the container in order to insure the best and most lasting exercise of function of the properly designed spring 21. It is preferable, moreover, to lock the top of the cylindrical spring-container 18 against relative turning movement within the hole 28 of the bar 26 and for that purpose the disclosed connection (used in an early model) serves as an exemplification. The recesses 29 comprise endwise divergent, upwardly inclined and flat-surfaced seats to which the tongues 25 conform, preparatory to effecting attachment therebetween as by small screws 30. In substitution for the latter, spot welding may come to be employed. The conventional shoe-tread plate 31 is then secured to the level upper surface of the bar 26, as by a series of screws 32, thereby confining and supplying a firm backing for the discs 22 which maintain the springs 21 under compression. The usual forward sole-clamps 33 rise from the plate 31 as does a heel-stud 34 provided with a forwardly facing bore 34, the purpose of which will next be explained.

When a roller-skate embodying the principle of the dual, universal-pivot connection at both ends and between the trucks and superstructure, comes to sustain the weight of the wearer, the roller pairs tend to turn in unison in response to any applied shift in weight laterally. The resulting action is duly sensitive yet always controlled.

Use of a roller-skate constructed according to my originated design lessens effort and avoids the unpleasant sensation caused by some earlier reacting connections between tread plate and trucks and traceable to a feeling that certain parts threatened to become separated. The invention is initially adjustable to suit the weight of the intended user and thereafter requires no readjustment. A sense of labor is minimized and the added maneuverability converts to a realization of pleasure. There is no possibility of any disconnection occurring anywhere and wear has been established over a time period of many weeks of daily use, each for several hours, to be quite negligible.

In operation, it is desired that a shift of weight (load) laterally upon the tread plate 31 will cause the two truck axles on a skate to turn from parallelism and to converge on the side toward which added load is applied, the imaginary vertex point of meeting being the radial point of the established curved path being executed and traveled. The cushioned, universal-pivot action between the bar 26 or shoe-tread plate 31 and each truck, upon further compression of the springs 21, exerts a force which acts to accomplish a turning of the trucks about the sockets 27 for the balls 10 carried by the trucks respectively. Thereby, the two trucks on each skate become turned in opposite directions with the same advantage of making a short turn which is attained by the independent front and rear steering of a long "hook and ladder," fire-fighting vehicle.

The drawings conform to the somewhat unrefined design of a hand-made, early model and though not promissory of the ideally smooth interaction, for instance, at the connection between the bracket 13 and lower end 19 of the container, the clearance between the stud 15 and the hole 14 which is of comparatively larger diameter (as shown) did permit the model to perform very successfully. The upper margin of the holes 14 might helpfully be filleted as well as shortening the curved lower end 17 with reference to the downward extent of the spherical surface 19 on the stud so as not to contact the bracket and create frictional resistance.

My roller-skate is contemplated for quality construction rather than quantity production.

The skate is to be custom-built, which is to say, pairs thereof will be specially fitted to suit the discerning, individual buyer, with due consideration of proper size, weight and proposed usage while incorporating any peculiar preference of fitting and adjustment. Nearly two decades of active participation at roller-skate contests indicated to me a series of corrections required for attainment of superior performance, cluminating in this engineered concept involving a reckoning with all desideratums of universal application made possible by the freedom from hampering rules which pertain to so many other sport articles. There has been confirmation by expert users of one of my early models that the design "achieves excellent edge control," that it facilitates short turns while imbuing with a sense of security, "establishes perfect balance" and "it's good for racing as well as for intricate pirouetting and dancing maneuvers."

I claim:

1. In a roller-skate, a truck, a bar, an appliance connecting said truck and bar and comprising; a stud provided with a head having a spherical surface with an axis normally oblique with respect to a floor and in connection with said truck, a container having interiorly a spherically-surfaced end and firmly connected with said bar, said spherical surfaces being appositioned, the upper margin of said container being oblique relative to its axis and a treadplate contacting said margin and secured thereacross to said bar.

2. In a roller-skate having a pair of trucks, a bar, and duplicated appliances connecting said bar with said trucks respectively, said appliances each comprising; a stud having a head formed with a downwardly directed spherical surface and being in connection with its truck, a partly cylindrical structure having its lower end interiorly defined by an apertured, upwardly concave spherical surface and having its upper, open end connected with said bar, a coil spring in said structure, a member resting on said spring and interlocked together with said cylindric structure against turning movement relative to said bar and a tread-plate covering and securing said interlocked fittings.

3. In a vehicle having a pair of trucks, a bar connecting said trucks, an obliquely disposed, universal-pivotal connection between each truck and said bar, a pair of tubes reversely oblique with respect to said first mentioned pair of connections and located between the latter, the bottom of each tube being formed as an apertured spherical surface, means for securing said tubes within said bar, a compression spring in each tube, a disc structure confining the top of each spring, the upper surface of each disc structure being oblique to its axis and the upper end of each tube being interlocked with said bar against turning movement relatively thereto, said discs being diametrically of progressively varying thickness to suit the obliquity of the tubes, and a threaded stud and nut couple for securing each tube to a truck, each stud being adjustably passed through the bottom of a tube and having a spherical surface interiorly appositioned to the bottom thereof.

4. In a roller-skate having a pair of trucks, a bar therebetween, four longitudinally alined, limited universal-pivot connections arranged in pairs between said bar and each truck, one pair of said connections being made with front and rear trucks respectively and each comprising ball and socket conformations carried in interfitted relationship by said trucks and bar respectively, the other pair of said connections between the bar and the front and rear trucks respectively each comprising a stud detachably secured to its truck together with a container secured to the lower side of said bar, said studs and containers having appositioned spherical surfaces, a coil spring within each container and exerting pressure against a container-enclosed portion of said stud and means for adjusting the pressure exerted by each spring.

5. In a roller-skate, a truck, a bar and an appliance connecting said truck and bar and comprising; a stud turnably connected with said truck, a container depending from said bar and enclosing a portion of said stud, the lower end of said container and the container-enclosed part of said stud being fashioned with appositioned spherical surfaces respectively, a cushion for maintaining contact between said spherical surfaces and means for holding said stud in position.

6. In a vehicle, a pair of trucks, a bar extending between said trucks, a pair of upwardly diverging, uiversal-pivotal connections between said trucks respectively and the ends of said bar, a pair of upwardly converging tubes having at their lower ends a limited universal-pivotal connection with said trucks respectively, said tubes being interfitted witht said bar, a reactive element in each tube, a member overlying each reactive element and means for adjusting each of said members to regulate the compression of said reactive elements.

THOMAS C. GLENN.

REFERENCES CITED

The following references are of record in the file of this patent:

UNITED STATES PATENTS

| Number | Name | Date |
|---|---|---|
| 241,270 | Akin | May 10, 1881 |
| 978,523 | Wanta | Dec. 13, 1910 |
| 1,159,897 | Christiansen | Nov. 9, 1915 |
| 1,206,864 | Lange | Dec. 5, 1916 |
| 2,233,355 | Ware | Feb. 25, 1941 |
| 2,330,338 | Dekome et al. | Sept. 28, 1943 |
| 2,424,072 | Allred | July 15, 1947 |
| 2,430,533 | Reich | Nov. 11, 1947 |